June 7, 1932.  F. G. HENRY  1,861,567
CARTONING MACHINE
Filed Jan. 11, 1929    2 Sheets-Sheet 1

FERDINAND G. HENRY
INVENTOR
BY
ATTORNEY

June 7, 1932.  F. G. HENRY  1,861,567
CARTONING MACHINE
Filed Jan. 11, 1929   2 Sheets-Sheet 2

FERDINAND G. HENRY
INVENTOR
BY
ATTORNEY

Patented June 7, 1932

1,861,567

UNITED STATES PATENT OFFICE

FERDINAND G. HENRY, OF PHILADELPHIA, PENNSYLVANIA, ASSIGNOR, BY MESNE ASSIGNMENTS, TO AMERICAN MACHINE AND METALS, INC., OF NEW YORK, N. Y., A CORPORATION OF DELAWARE

CARTONING MACHINE

Application filed January 11, 1929. Serial No. 331,806.

This invention relates to cartoning machines for placing protecting tubes or shields upon common beverage bottles and other similar objects.

One of the objects of the invention is to provide a simple and efficient machine for placing shields over bottles.

More particularly it is an object of the invention to provide simple means for taking the shields from a machine which delivers them in a horizontal position and bringing them to a vertical position for placing them on upright bottles.

A further object is to provide a machine which drops shields on bottles by gravity.

Another object is to provide means for causing the shield to slide onto the bottles readily and smoothly.

Other objects are to provide a bottle conveying mechanism in which the bottles are moved smoothly and continuously, and to provide mechanism by which cartons are placed on bottles while the bottles are moving continuously.

A still further object is to provide a machine in which cartons carried in an intermittent conveyor are placed on continuously moving bottles.

Figure 1:
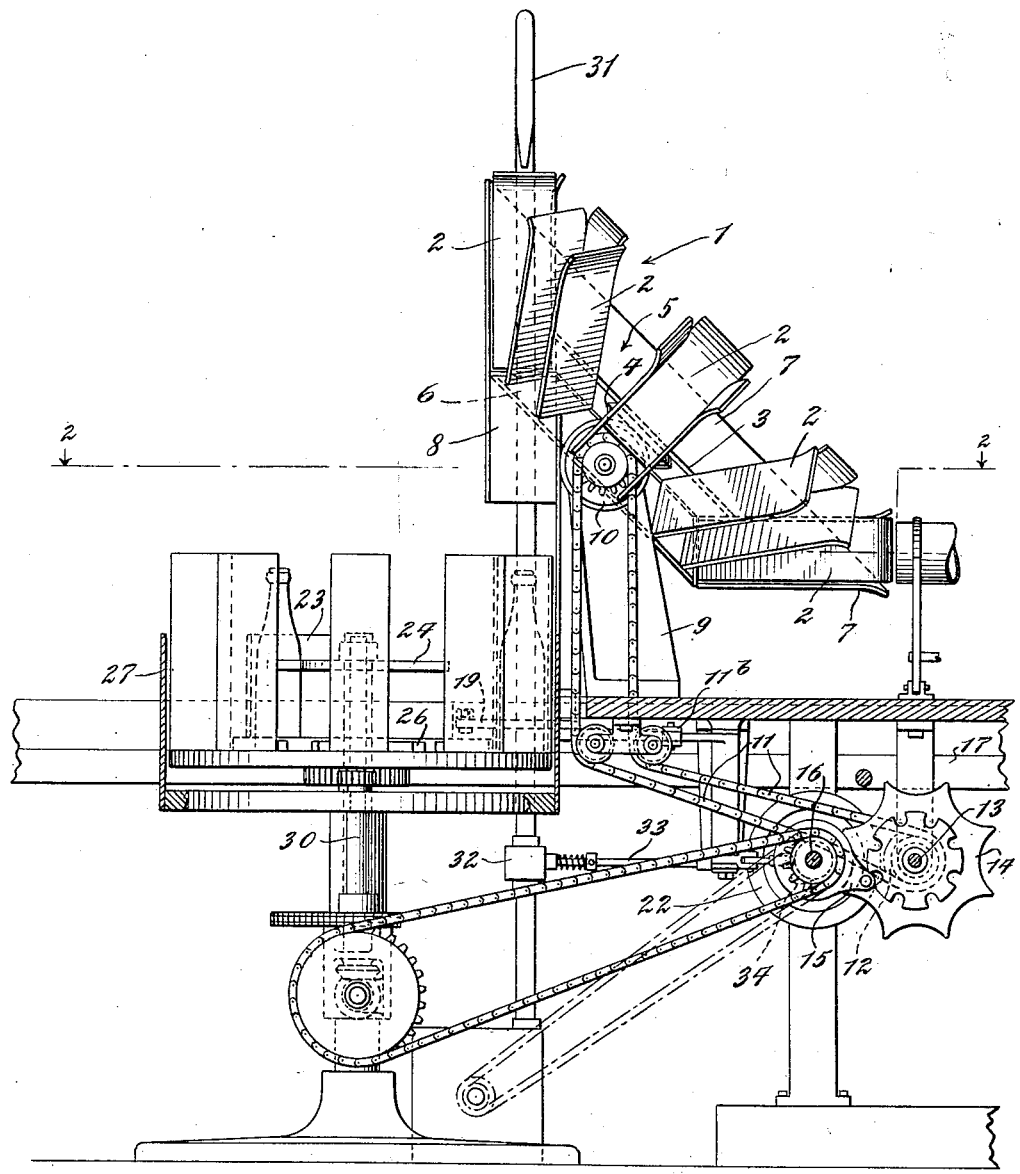
Figure 2:
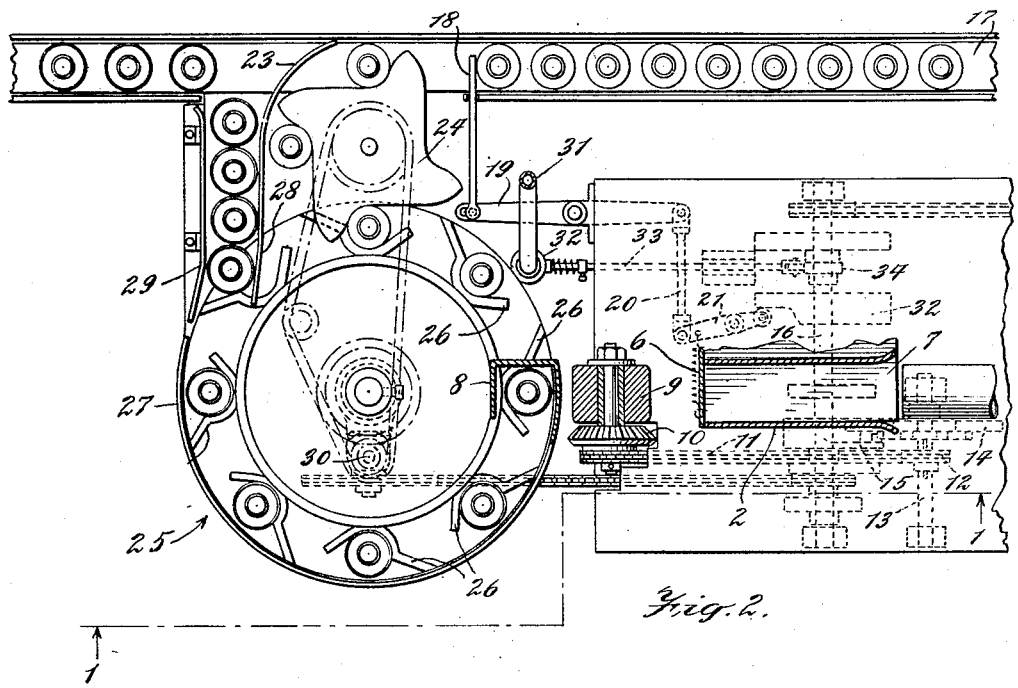
Figure 3:
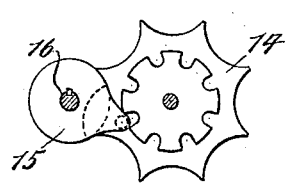
Figure 4:
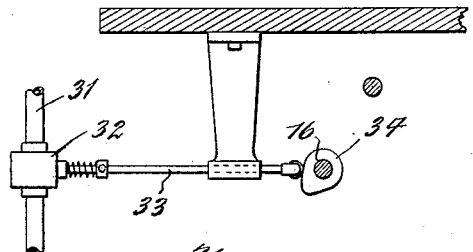

Other objects of this invention and the manner in which all the objects are attained will be evident from the following description and drawings:

In the drawings Figure 1 is a side elevation partly in section, of a machine embodying my invention together with a portion of a cooperating carton making machine. Figure 2 is a section along 2—2 of Figure 1 with the rotary head 1 and the pocket closing shield 5 removed, but with the position of the lowest pocket 2 shown dotted. Figures 3 and 4 are detail views of portions of the machine.

The principal parts of the machine are a carton conveyer, a bottle conveyer, and an air jet device, together with the necessary mechanism to support and operate these parts.

Referring to the drawings and especially the first figure, reference numeral 1 indicates a rotary head comprising eight three sided box-like pockets 2 arranged conically as shown. These are supported by a spider or disk 3, attached to a bevel gear 4. This gear 4 is rotatably mounted on an upright support 9 and meshes with a second bevel gear 10 which has a sprocket hub. The gear 10 is driven through its sprocket, a chain 11, a sprocket 12, and a shaft 13 from a cam wheel 14. The cam wheel 14 forms part of an eight slot Geneva movement as shown in Figure 3. It is intermittently rotated by the pin-cam 15 on the shaft 16. Since the gear-ratio between the cam wheel 14 and the bevel gear 4 is 1:1, the rotary head is intermittently rotated 1/8 of a turn (i. e., one pocket) for each revolution of pin-cam 15.

Cooperating with the rotary head 1, is the pocket-closing shield 5. This comprises an inner conical zone 6 which closes the inner ends of the pockets 2, and an outer conical zone 7 which closes the open sides of the pockets. The outer zone extends a little more than half way around the rotary head so as to cover the bottom pocket, the top pocket, and all the intermediate pockets on the rising side. The inner zone extends less far by the width of one pocket. It covers the bottom pocket and all the pockets on the rising side of the head up to the top pocket, but it ends just short of the top pocket. Thus when the rotary head is stopped, the bottom pocket is closed at end and side, the top pocket is open at the bottom end but closed at its side, the intermediate pockets on the rising side are closed at end and side. The closing shield also includes a downwardly extending chute 8. This chute is closed on three sides but open on the side which the bottles last leave, as described below. It extends down nearly to the level of the bottle tops, and the side which is outside the circle of bottles extends even further down and is integral with the circular guard rail 27.

The bottle conveyer comprises a belt conveyer 17, with a holding gate 18, a rotary table 25, a guide 23 and a pusher wheel 24 for transferring bottles from the belt-conveyer to the rotary table, and a pair of guides 28 and 29 for transferring the bottles back to the belt conveyer.

The belt conveyer is of the ordinary straight type, comprising a chain whose links have plates attached so as to form a smooth conveyer surface on top and a sprocket-engaging surface underneath. These plates may be made of such length as to act as spacing guides. That is the distance between corresponding points of successive plates may be made to be the desired distance between bottles, in which case the plates would serve as indicators to enable an operator readily to locate the bottles correctly. The belt conveyer moves fast enough to supply more bottles than are needed. There is a holding gate 18 operated through a linkage 19, 20, 21 by the cam 22. This gate releases the bottles one by one as they are needed.

23 is a guide and 24 is a pusher wheel. The purpose of the guide is to deflect the bottles and hold them against the pusher wheel. The pusher wheel is driven uniformly by gears, sprocket wheels, and a chain, from shaft 30. The rotary table 25 is also driven from shaft 30, the gear ratios being such that the rotary table turns uniformly at half the angular velocity of the pusher wheel. The ratio between pin-cam 15 and shaft 30, moreover, is such that the rotary table makes 1/8 revolution per 1/8 revolution of the rotary head 1, although the table rotates uniformly and the head rotates intermittently.

There are eight low pocket-forming ridges 26 on the surface of the rotary table 25. These ridges are low enough to pass under guide 28.

Reference numeral 27 indicates a stationary circular guard-rail about the rotary table 25, while the pair of guides 28 and 29 form a guideway for bottles leaving the rotary table. Guide 28 projects into the path of the bottles so as to engage them and deflect them into the guideway. Each pocket forming ridge 26 extends out to the periphery of the table and is shaped as shown so that it pushes its bottle into the guideway until the bottle is clear of the table. A row of the bottles forms in the guideway as shown in Figure 2 and each incoming bottle slides the row along so that the bottle at the other end of the row is pushed onto the belt conveyer.

In order to aid the shields in slipping into position on the bottles a compressed air device is provided. This device comprises a tube 31 connected to a source of compressed air and provided at its other end with a jet nozzle pointed downward toward the position where the top pocket of the rotary head comes to rest, so as to blow air down through the top pocket 2 and the guiding chute 8. For controlling the air jet there is a valve 32 operated thru the pusher rod 33 from the cam 34 (see Figure 4), the cam being timed to open the valve each time that one of the pockets 2 reaches the top position. This is also the moment when one of the bottles is just passing under the guiding chute 8.

The operation of the machine is as follows:

Bottles are fed by hand or by another machine onto the conveyer belt at the correct rate or a slightly higher rate than necessary. If the rate is higher than that necessary, the gate 18 holds the bottles back and releases them as needed, while if the rate is correct and the bottles correctly positioned the gate can be omitted. The guide 23 and the pusher wheel 24 slide the bottles off the belt, and push them onto the rotary table 25 into the pockets 26. The peripheral speed of the pusher wheel (measured on the circle which goes through the centers of the bottle-positions) is just equal to the peripheral speed of the rotary table similarly measured. So the bottles move continuously at the same speed and there is no tendency for the bottles to tip during the transfer from pusher wheel to table. The only force tending to make them tip while being conveyed by the pusher wheel is the centrifugal force resulting from the circular path of that wheel. Guard 23 prevents the outward tipping which this force tends to produce. The belt speed is lower than the pusher wheel's peripheral speed, but as the pusher wheel engages the bottle at a point about opposite the center of gravity thereof there is little tendency for the bottle to be tipped over due to the forward thrust of the pusher wheel.

On the rotary table each bottle rides smoothly around under the chute 8, through which a paper shield or carton is dropped just as the bottle passes beneath it, as will be more fully described below. At this same moment through the opening of the valve 32, through the action of the cam 34, a jet of air is blown down from tube 31 through the paper carton which is falling over the bottle neck. This jet spreads the paper carton, centers it on the bottle, and furnishes a lubricating air film which makes the carton drop down over the bottle more surely. The carton may not slide clear down on the bottle at once, but may continue to settle as the bottle passes around the rotary table, and therefore the guiding chute 8 is made open on the side toward which the bottles move after receiving the carton.

When the bottles come around to the guideway 28, 29 the guide 28 deflects them from the table. The pocket forming ridges 26 through a sort of cam action force the bottles clear of the table and into the guideway. Each bottle of the row in the guideway pushes the next one; so that the last bottle of the row is forced out onto the belt conveyer again. The belt conveyer then carries the bottle to the next machine or to an operator who takes them off.

The action of the paper-carton conveyer which drops one carton down the chute every time a bottle passes beneath is as follows.

The cartons are intermittently delivered from a carton forming machine of any desired construction which is adapted to deliver completed sleeve-like cartons endwise along a substantially horizontal path to the said conveyer. The carton forming machine is indicated as furnishing the driving power for the cartoning machine of this application; so the machines operate in synchronism. When the rotary head 1 comes to rest with one pocket at the lowest position, a carton is pushed into the said pocket. Then the head turns ⅛ turn to brink another empty pocket to the lowest position for filling. As the pockets rise intermittently the cartons are retained by the pocket closing shield 5 until the top position is reached. As each pocket arrives at the top position and stops there the carton drops down, because the inner zone 2a of the shield, which closes the bottoms of the pockets, ends just short of this position, as described above. The synchronization between the carton conveyer and the bottle conveyer is obtained as described above by driving the bottle conveyer from the shaft 19 which also operates the Geneva movement (see Fig. 3) for the carton conveyer.

It will be obvious that such variations and modifications as would occur to one skilled in the art may be made without departing from the spirit of the invention as set forth in the appended claims. It is not essential, for example, that the pockets 1a of the rotary head 1 be arranged in a cone of just 90° vertex angle.

While I have found it desirable to make the peripheral speeds of the pusher wheel 13 and the rotary table 14 the same, it might be found desirable to give the pusher wheel a lower peripheral speed than that of the table. In such case each arm of the pusher wheel should be curved so that it would extend partially around the bottle which it pushes. With this arrangement the guide 23 would be unnecessary because the curved arms of the pusher wheel would be capable of sliding the bottles off the belt and around onto the table without a guide.

What I claim is:

1. In a cartoning machine, means for moving bottles past a station, means for dropping cartons on said bottles and means for blowing a jet of air through the carton around the bottle during the dropping operation.

2. In a cartoning machine, a horizontal conveyor for moving bottles past a station, and means comprising a conical shaped member rotatable about an axis oblique to said conveyer and having pockets therein for moving cartons from a horizontal position beside said station to a vertical position above said station and dropping them on said bottles.

3. In a cartoning machine, in combination, means for moving articles past a station, means for dropping cartons onto said articles at said station, and means for directing a quantity of lubricating fluid around the articles as the cartons are dropped thereon.

4. In a cartoning machine, in combination, a conveyor for moving an upright bottle to a station, a sleeve-transferring element mounted to rotate about an axis inclined with respect to the plane of operation of said conveyor, said element being angularly disposed with respect to said inclined axis, and means for moving said element from a sleeve-receiving position substantially parallel to said plane of operation to a delivery position substantially normal to said plane of operation and directly above said station.

5. In a cartoning machine, in combination, a conveyor for moving an upright bottle to a station, a sleeve-transferring element mounted to rotate about an axis inclined with respect to the plane of operation of said conveyor, said element being angularly disposed with respect to said inclined axis, means for moving said element from a sleeve-receiving position substantially parallel to said plane of operation to a delivery position substantially normal to said plane of operation and directly above said station, and means cooperating with said element to retain a sleeve during its travel from one position to the other and to permit said sleeve to drop onto said bottle when said delivery position has been reached.

6. In a cartoning machine, in combination, a conveyor operating in a horizontal plane for successively moving articles to a cartoning station, means comprising a plurality of pockets distributed in conical formation and mounted to rotate about an axis inclined with respect to said horizontal plane, and means for rotating said pocket mounting to move said pockets successively from a horizontal sleeve-receiving position to a vertical sleeve delivery position directly above said station.

7. In a cartoning machine, in combination, a conveyor operating in a horizontal plane for successively moving articles to a cartoning station, means comprising a plurality of pockets distributed in conical formation and mounted to rotate about an axis inclined with respect to said horizontal plane, means for rotating said pocket mounting to move said pockets successively from a horizontal sleeve-receiving position to a vertical sleeve delivery position directly above said station, and means cooperating with said pocket mounting to retain a sleeve within each of said pockets during its travel from receiving to delivery position and to permit said sleeve to drop onto an article occupying said station when said delivery position has been reached.

8. In a cartoning machine, in combination, a conveyor operating in a horizontal plane for successively moving articles to a cartoning station, means comprising a plurality of pockets distributed in conical formation and mounted to rotate about an axis inclined with respect to said horizontal plane, means for rotating said pocket mounting to move said pockets successively from a horizontal sleeve-receiving position to a vertical sleeve delivery position directly above said station, means cooperating with said pocket mounting to retain a sleeve within each of said pockets during its travel from receiving to delivery position and to permit said sleeve to drop onto an article occupying said station when said delivery position has been reached, and means for guiding said sleeve in its descent onto said article.

In testimony whereof, I have signed my name to this specification this 8th day of January, 1929.

FERDINAND G. HENRY.